Feb. 12, 1963 W. FRANZEN 3,077,538
APPARATUS FOR MEASURING RADIANT FLUX
Filed Dec. 21, 1959 2 Sheets-Sheet 1

Wolfgang Franzen
*INVENTOR.*

BY *Bessie A. Lipper*
Attorney

Wolfgang Franzen
INVENTOR.

United States Patent Office 3,077,538
Patented Feb. 12, 1963

3,077,538
APPARATUS FOR MEASURING RADIANT FLUX
Wolfgang Franzen, Westford, Mass., assignor to Arthur D. Little, Inc., Cambridge, Mass., a corporation of Massachusetts
Filed Dec. 21, 1959, Ser. No. 860,754
18 Claims. (Cl. 250—83.3)

This invention relates to method and apparatus for measuring the intensity of infrared and microwave radiation and more particularly to a modified superconducting bolometer.

With the increased use of detection systems based upon the detection and measurement of infrared and of short wave length microwave radiation, it has become necessary to seek new methods and apparatus capable of detecting and measuring the intensity of radiant flux at very low power levels. Moreover, devices of this character would be particularly well suited to spectroscopic techniques utilizing the far electromagnetic spectrum (i.e., wavelengths from about 50–500 microns). These applications in turn require method and apparatus which are highly sensitive, which have extremely low inherent noise levels and possess the ability to operate rapidly. The apparatus of the prior art is no longer capable of adequately meeting all these requirements for the detection of electromagnetic radiation in the far infrared and long wave length microwave part of the electromagnetic spectrum.

The devices of the prior art suitable for measuring infrared radiation are generally classed as thermal detectors and photon-detectors. The thermal detectors have reached the point in sensitivity that the minimum radiant flux which can be observed is set by fluctuations in their output which arise from fundamental causes rather than from peculiarities of their design. (See for example page 56 of "The Detection and Measurement of Infra-Red Radiation" by Smith, Jones and Chasmar.) Among such fundamental causes may be listed the so-called Johnson noise and spontaneous fluctuations in temperature, both of which increase with increasing absolute temperature. Thus the standard class of thermal detectors (thermocouples, bolometers and Golay cells) in their present forms cannot be improved any further to overcome operation drawbacks such as relatively slow response and limited sensitivity, when they are operated at ambient temperatures commonly encountered on the earth's surface.

Several modifications in the bolometer have been attempted to increase sensitivity and speed of thermal detection, as limited by fundamental causes, by operation at temperatures in the liquid helium range. One of these has been to use a semiconductor rather than a pure metal as a sensitive element in a bolometer and to operate the bolometer thus constructed at low temperatures. However, the semiconductor bolometers exhibit excess noise which may be attributed to current noise and contact noise, the former being a characteristic phenomenon of the conduction process in semiconductors and powders. Furthermore, they have a relatively high electrical resistance and therefore a relatively high Johnson noise level, as compared with the device described herein. Current noise is approximately inversely proportional to frequency and hence at low frequencies it dominates all other noise sources in semiconductor bolometers.

Another approach to the modification of bolometers was made by Andrews (see U.S. Patent 2,533,908). In this case the bolometer element was formed of a material which undergoes a gradual change from the superconducting to the normal state as temperature is increased. In this type of superconducting bolometer, one entire surface of the bolometer element was fixed in thermal contact with a reservoir which was required to be maintained at a temperature within 0.02° K. of the transition temperature of the superconducting material, niobium nitride. When radiant flux was directed onto the element, the entire superconducting strip then tended to pass into an intermediate state between superconductivity and normal conductivity. This arrangement required extremely fine temperature control, or meant that if this was not achieved temperature fluctuations were greatly magnified, thus contributing an unwanted signal. In attaching one entire flat side of the element to the reservoir the heat capacity of the system was materially large and the response speed and sensitivity were therefore proportionately smaller, as compared to the superconducting bolometer of this invention. Moreover, in this prior art bolometer additional sources of noise are associated with fluctuations in the superconducting domain structure in the intermediate state inasmuch as the entire bolometer element is necessarily in the intermediate state when in operation.

As noted above, the prior art apparatus also includes photon-detectors which may be generally classed as photo-emissive and photo-conductive detectors. These photon-detectors make use of the photo-electric effect, and in principle they operate by counting the number of effective quanta of radiation absorbed. In the photon-detectors only quanta having an energy greater than a certain minimum value are effective, the detector being insensitive to the presence of quanta of lower energy. Since this minimum value is characteristic of the type of detector, this means that any one photon-detector is sensitive to a relatively narrow wave length band.

In view of the increasing need for extremely sensitive devices of rapid response for detecting low-energy infrared and microwave radiation over a wide spectrum of wave lengths it is desirable to have method and apparatus which are of the thermal detecting type and which at the same time overcome the fundamental drawbacks now inherent in the present thermal detectors.

It is therefore a principal object of this invention to provide method and apparatus of high intrinsic sensitivity for detecting low power level electromagnetic radiation of the character described which have noise levels approaching the very low ideal levels attainable at temperatures approaching absolute zero and which are independent of the wave length of the electromagnetic radiation incident thereon. It is another object of this invention to provide a modified bolometer particularly suited for the detection of infrared and short wave length microwave radiation. It is yet another object to provide such apparatus which exhibits rapid response times and which is particularly well suited for use in detecting systems based on the detection and measurement of infrared and short wave length microwave radiation. It is yet another object to provide a truly superconducting bolometer which has a very low noise level, which overcomes the drawbacks inherent in bolometers constructed of semiconductors or materials existing in an intermediate superconducting state, and which is relatively insensitive to reservoir temperature fluctuations.

The apparatus of this invention may be characterized as being a bolometer comprising a thin elongate element responsive to radiant flux incident thereon and circuitry adapted to determine the variations in resistance of said element with variations in the intensity of radiant flux, the element being formed of a material capable of exhibiting superconductivity; and the bolometer being further characterized as having temperature controlling means associated with the element and adapted to maintain the terminal ends of the element in a superconductive state while the central portion of the element is maintained in the normal resistive state.

In the bolometer of this invention the central portion of the sensing element is maintained in the normal resistive state, once it has been made resistive, because of the power dissipated in the central normal portion by a current flowing through the sensing element. This power dissipation gives rise to a heat flow, and therefore a temperature gradient extending from the center toward each end. If the two ends are cooled to a temperature lower than the superconducting transition temperaure, and if the heating current exceeds a certain minimum value, the central region will remain in a normal resistive state, while the two ends are in the superconducting state.

The length of the central portion then varies in response to the intensity of the radiant flux falling on it when the apparatus is being used as a thermal detector. This variation in length gives rise to a variation in the total electrical resistance from one end of the normal region to the other. The resistance is measured by the voltage drop produced across it from one end to the other by the heating current.

If an external magnetic field is present, then in the normally resistive portion of the film the magnetic induction penetrates into that portion of the material, whereas it does not penetrate into the superconducting portion of the film. If the length of the normally resistive portion of the film changes in response to the external radiation falling on it, the portion of the film into which the magnetic induction penetrates correspondingly changes. This effect may also be used as a means for determining the length of the normal resistive portion of the element and therefore of the intensity of the incident radiant flux.

The bolometer of this invention possesses the unique feature in that there exists a relatively large temperature difference, i.e., of the order of 2 to 4° K., between the center and each of the two ends of the sensing element, that is the central resistive portion is maintained at a temperature from about 2 to 4° K. higher than the terminal superconducting ends. The exact temperature difference will depend upon the material from which the sensing element is made, and on the dimensions and operating conditions of the bolometer. As a result of this relatively large temperature differential, the fluctuations in the temperature of the constant temperature reservoir used to maintain the terminal ends below their critical temperature have very little influence upon the performance of the bolometer itself.

The method of detecting thermal radiation in accordance with this invention may be defined as one characterized by the step of directing radiant flux onto the central portion of a superconducting sensing element, the terminal ends of which are maintained at a temperature below the transition point of the element, while the central portion is maintained in a normal resistive state by current flowing therethrough whereby the length of the central portion of the element in the normal resistive state is varied in responsive relationship to the intensity of the radiation thereon.

Inasmuch as in the superconducting bolometer of this invention the sensitive elongate element is partly in the normal or resistive state and partly in the superconducting state, the boundaries between these two states are sharp and the intermediate state regions are reduced to minimum segment lengths, thus reducing intermediate state fluctuations to a minimum. In operation, radiant flux incident on the bolometer is absorbed as heat energy which in turn causes fluctuations in the length of the portion of the element in the resistive state and hence fluctuations in the overall resistivity of the element.

By using a material such as tin, which is capable of true superconductivity, it is possible to take advantage of the very low inherent noise power levels obtainable at these low temperatures. At the same time the heat capacity of the element is minimized while its thermal conductivity is maximized, thus contributing to its speed of operation. Moreover, the element is relatively insensitive to fluctuations in the temperature of the reservoir means used to maintain the terminal ends of the bolometer element in a superconductive state. These achievements in turn mean that the superconducting bolometer of this invention has an extremely low noise level, is highly sensitive, has a fast response and at the same time is not restricted to measuring radiant flux of a particular wave length region.

This invention will be further described with reference to the accompanying drawings, in which.

In describing the method and apparatus of this invention, it will be helpful first to point out that there are certain electrical conductors which when subjected to temperatures approaching absolute zero, in the absence of an applied magnetic field, change suddenly from a resistive state to a superconductive state in which their resistance is identically zero as the temperature approaches absolute zero. The temperature at which this change occurs is known as a transition or critical temperature of the superconductive material. When a magnetic field is applied to the conductor, the transition or critical temperature is lowered and when a sufficiently intense magnetic field is applied a point will be reached at which the material no longer exhibits superconductivity no matter how low the temperature. A number of pure elements are known to exhibit superconductivity at temperatures ranging between zero and 17° K. For example, in the absence of any applied magnetic field, tin becomes superconductive at 3.73° K., lead at 7.22° K., thallium at 2.39° K., tantalum at 4.38° K., indium at 3.40° K., and niobium at 8.70° K. For the practice of this invention tin has been found to be particularly well adapted for the bolometer element, but elements such as lead, indium and thallium are equally suitable.

Figure 1:
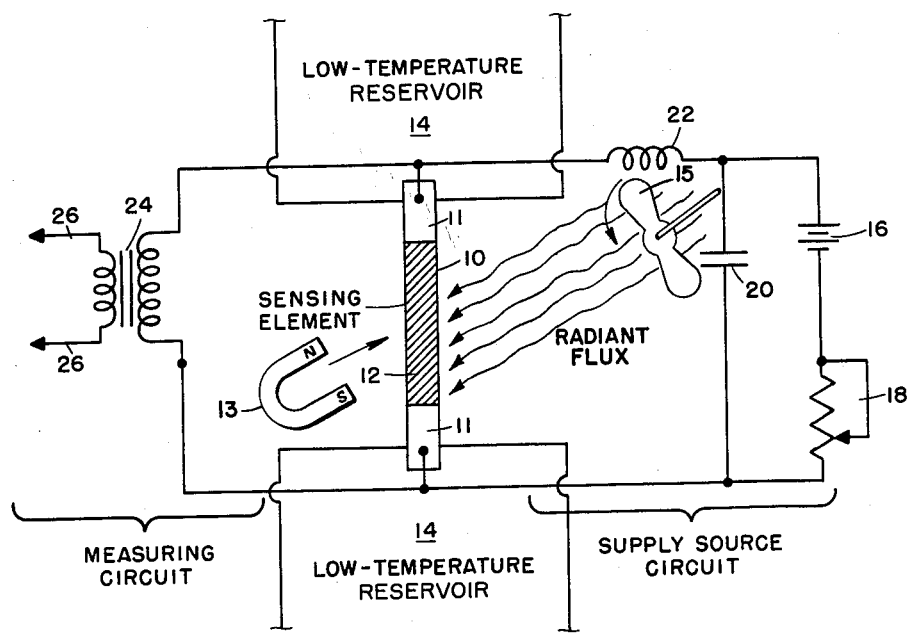
FIG. 1 is a schematic diagram of the bolometer of this invention.
Figure 2:
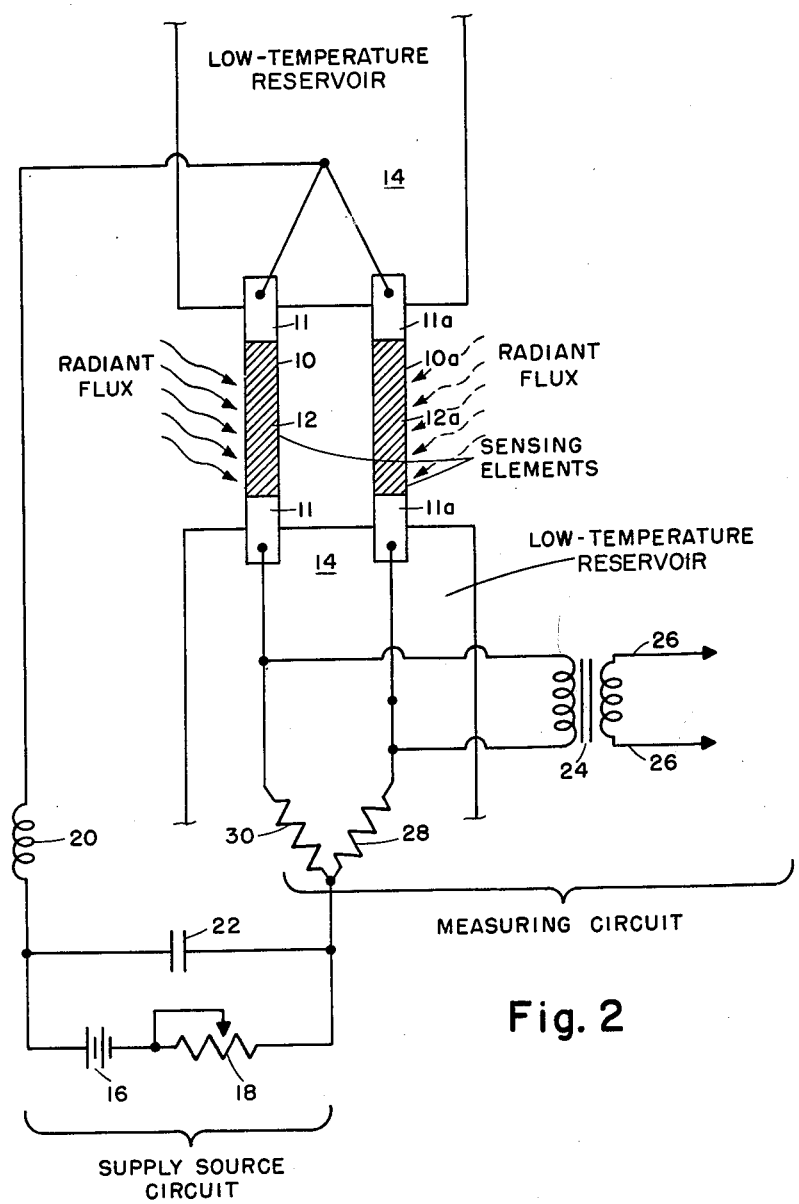
FIG. 2 is a schematic diagram of a modification of the bolometer of this invention.

FIG. 1 is a schematic diagram of a relatively simple form of a superconductive bolometer constructed in accordance with the teachings of this invention. This modification illustrates a single bolometer strip exposed to chopped infrared radiation. FIG. 2, which will be discussed below, illustrates another modification of the bolometer in which two elements are used as two arms of a Wheatstone bridge.

Figure 3:
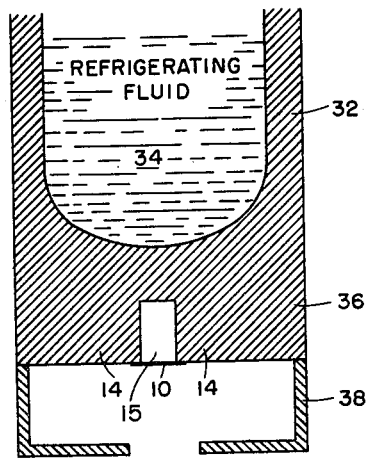
FIG. 3 is a cross-sectional representation of a typical temperature control device which may be used to maintain the bolometer element below the critical temperature.

Returning now to FIG. 1, there is provided a bolometer element 10, which may conveniently be a thin tin strip coated upon a thin strip of aluminum oxide. The element 10 is shown to be divided into two portions, the terminal ends 11 being in a superconductive state while the central portion 12, shown by cross-hatching, is in a normal or resistive state. As will be apparent in the following description, the variation in the length of central portion 12 maintained in the normal or resistive state is used as a measure of the intensity of the radiant flux directed on the element 10. Each of the terminal ends 11 of the element are bonded in a manner to achieve good thermal contact with a reservoir 14 while at the same time being electrically insulated from the reservoir. This low-temperature reservoir may conveniently be a container cooled to a temperature below which the bolometer element becomes superconducting. For example, the low-temperature reservoir should be maintained at about 2° K. if tin is used while this may be 4.2° K. for a bolometer using a lead element, 1.5° K. for one having an element of thallium and 2° K. for an indium element. In the case of tin and indium the temperature required may be achieved by using a bath of superfluid helium while in the case of lead, liquefied helium at its boiling point may be used. The reservoir is conveniently constructed of a metal which has a very high heat conductivity at these very low temperatures, for example copper. Such a reservoir is illustrated in FIG. 3 and will be described below.

Connected to the two terminal ends 11 of the bolometer element 10 are two circuits which may be designated as the current-source circuit and the measuring circuit. The current-source circuit in the arrangement illustrated in FIG. 1 consists of a stable current source 16, such as a mercury cell or a specially designed lead storage cell, and an adjustable resistance 18 with a filter condenser 20 wired in parallel. Finally there is provided a superconductive inductance coil 22 such as for example an iron core wound with lead wire and cooled to liquid helium temperature. The condenser-inductance arrangement is used to effectively filter out the noise sources associated with the current supply. This circuit supplies extremely stable current to the element 10. With this type of circuit, it will be necessary to chop the radiation reaching the bolometer element and this may be done by any one of a number of known devices such as a rotating disk with cut-out sectors, illustrated at numeral 15 in FIG. 1. It will be appreciated that the circuitry shown in FIG. 1 and FIG. 2 is illustrative of the type of circuitry that may be used and that variations and modifications in this circuitry are possible and contemplated without departing from the scope of this invention.

The measuring circuit in FIG. 1 is shown to include a superconductive step-up output transformer 24, the primary coil of which has leads 26 to a room temperature amplifier. (Such a superconductive transformer is described in J. Sci. Instr. 32, 172 (1955)). After amplification the signals may be measured and recorded by any known technique.

In using the bolometer of this invention, the element is brought to its superconductive state by virtue of its thermal contact with the temperature reservoir 14 and then the central portion is rendered resistive, such as by applying a magnetic field to the element by any one of a number of standard means, such as by bringing magnet 13 near the element; and is then maintained in the resistive state, after removal of the external magnetic field, by the heat dissipated in the central normal portion by the current passing through the element. In using tin as the sensing element, it has been found, as will be described below in the presentation of an example, that in order for the normal region to be stable, it is preferable that this region comprise at least one-half the length of the bolometer during bolometer operation.

Inasmuch as the magnetic induction of a superconducting material, such as that which is suitable for the bolometer of this invention, is zero in the superconducting state, the change in magnetic induction of the sensing element brought about by radiant flux striking the element may also be used to measure the intensity of the radiant flux as it causes changes in length of the normally resistive central portion of the element.

In FIG. 2 there is shown another modification of the bolometer of this invention in which there are provided two identical sensing elements 10 and 10a arranged in a bridge circuit. As in the case of the bolometer of FIG. 1 the terminal ends 11 and 11a are attached by good thermal bonding to low temperature reservoirs 14 while being electrically insulated therefrom. Also as in the case of the bolometer element of FIG. 1, each of the central portions 12 and 12a of the elements is in a resistive state. When no radiant flux is incident upon either of the elements the arms of the bridge are in balance. In the operation of the detecting device of FIG. 2, as in the usual way of operating a bolometer having opposed elements as shown, radiation (indicated by the solid-line arrows) is permitted first to strike the central portion of element 10 but not element 10a. The radiant flux thus absorbed by the central portion 12 of the element 10 heats this portion and thus increases the resistivity of the element by lengthening the central resistive portion 12. A chopping device, such as a pair of rotating disks similar to disk 15 illustrated in FIG. 1, then cuts off radiation to element 10 and directs it onto element 10a as shown by the dotted-line arrows. This element 10a reacts in the same manner as element 10, with the result that the bridge circuit shown is unbalanced periodically, giving rise to an unbalance voltage across the bridge. The periodic variation of this unbalanced signal corresponds to an A.C. signal from the bolometer, the amplitude of which varies with the intensity of the incident radiation.

As an alternative method of operation, radiant flux may be permitted to strike one element only. The intensity of the radiant energy is then determined by the amount of current required to maintain the bridge in balance.

The remaining portion of the apparatus of FIG. 2 is similar to that of FIG. 1 in that there is provided a current source circuit comprised, as in FIG. 1, of a stable electrical source 16, an adjustable resistance 18, filter condenser 20 and a superconducting inductance 22. Likewise the measuring circuit comprises a superconducting step-up output transformer 24 with one of the coils having leads 26 to a room temperature amplifier as in FIG. 1. Means such as magnet 13, shown in FIG. 1, may also be incorporated into the apparatus of FIG. 2.

In FIG. 3 there is illustrated one possible construction of a low-temperature reservoir suitable for the practice of this invention. Such a reservoir comprises a vessel 32 constructed of a material which has very high conductivity at low temperatures, such as copper. Liquid helium in its normal or superfluid state is present in the vessel 32 which in turn maintains the bottom portion of the vessel 36 and the terminal ends of the bolometer element 10 at the desired temperature. In order to provide an arrangement whereby the central portion of the bolometer element may be retained in the resistive state, the bottom portion of the vessel may be constructed as in FIG. 3 to provide a gap or opening 15 defined by the bottom portion 14 of the reservoir across which the bolometer element 10 may be placed. It may also be desirable to place a magnetic shield, of superconducting lead or permalloy or similar material, 38 around the bolometer and a portion of the housing.

An example of the construction and operation of the bolometer of this invention is illustrated in the following detailed description. It will be understood, of course, that the following detailed description represents only one embodiment of the bolometer of this invention and that a number of the component parts may be varied or changed without departing from the scope of the invention.

In choosing a pure metal for the sensing element of the bolometer it has been found that tin possesses a number of desirable properties. Because of its comparatively high Debye temperature, tin exhibits only a residual electrical resistivity in the normal state at low temperatures. It may therefore be expected that the thermal conductivity is also largely limited by residual impurities in the normal state as well as in the super-conductive state down to a fraction of the transition temperature which occurs at 3.73° K. Therefore by using sufficiently pure tin very large thermal conductivities in the normal state are attainable.

The heat capacity of tin at liquid helium temperatures is very small, which means that a superconductive bolometer employing tin as a sensing element and constructed in accordance with the teaching of this invention has an extremely fast response. Moreover tin is easily evaporated to form superconductive films in the order to 1,000 A. thick.

In addition to tin, a number of other metals are also, of course, suitable for the sensing element of this invention and they include lead, thallium, indium, niobium and tantalum.

The ends of the bolometer strip made of tin may be easily contacted to wires to complete the required circuitry since it is easy to make super-conductive contacts to tin strips with lead wire or similar substances.

A 1,000 A. thick film of tin, as contemplated here, is not self-supporting, but requires a substrate of some sort. It has therefore been found convenient to evaporate the tin film on a thin film of aluminum oxide, which can be prepared by electrolytic oxidation of aluminum, and subsequent removal of the remaining aluminum with HCl, by a known technique. Electrolytic oxidation reults in very uniform, hole-free films of $Al_2O_3$ which are mechanically quite strong; they can be prepared to thicknesses as small as a few micrograms/cm.$^2$ (~100 A.).

The $Al_2O_3$ substrate will of course add to both the heat capacity and the heat conductivity of the device. However, the heat capacity of $Al_2O_3$ at low temperatures is very small. On the other hand, its thermal conductivity is large, a fact which contributes to increasing the speed of operation of the bolometer of this invention.

The typical bolometer element of this example is 0.4 cm. long, 0.025 cm. wide and $1 \times 10^{-5}$ cm. thick. Assuming an average heat conductivity in the superconducting state of 0.2 watts/cm.-deg. and an electrical resistivity in the normal state of $4 \times 10^{-7}$ ohm-cm. (both of these values having been reduced to account for the size effect in thin films) and a reservoir temperature is 2° K., then the limiting heating current required to maintain a stable normal region in the center of the strip, $i$, is given by $$i = \frac{2a}{l\sqrt{\rho}} \sqrt{\bar{K}_s(T_c - T_o)} = 2.3 \times 10^{-3} \text{ amperes}$$

where $a$=cross-sectional area of strip
$l$=one half bolometer strip length
$\rho$=average electrical resistivity in the normal state
$\bar{K}_s$=average heat conductivity of strip material in superconductive state
$T_c$=transition temperature of strip material
$T_o$=reservoir temperature.

The power dissipated by this current in a normal region 0.2 cm. long (at the resitivity quoted above) is 1.7 microwatts. This amount of power is very much larger than the signal power W that the bolometer is designed to detect, thus illustrating the sensitivity of the superconducting bolometer of this invention.

FIG. 2 may be considered a typical way in which the superconducting bolometer of this invention may be constructed and operated. In the mode of operation of FIG. 2 the effect of reservoir temperature fluctuations should be eliminated for all practical purposes where the two identical bolometer elements serving as arms to the bridge are balanced in the absence of external radiation. In the operation of this bolometer a radiation chopping device (such as illustrated in FIG. 1) then alternately exposes one bolometer element or the other to the external radiation, thus balancing out the effect of reservoir temperature fluctuation.

In the measuring circuit it will be shown that the output is directed into a superconducting output transformer and that the primary coil is then attached to leads going to an amplifier. Where the incident radiation is chopped the signal amplitude can be stepped up by a large factor by the use of a Templeton-MacDonald superconduction output transformer such as described in the "Journal of Scientific Instruments," No. 32, 172 (1955). The use of this transformer makes it possible to transmit a sizable A.C. signal to room temperature, thus eliminating for all practical purposes the effect of the thermal E.M.F. which will appear in the output leads as a result of the temperature difference between the cold temperature reservoir and room temperature.

It is, of course, necessary to maintain those portions of the reservoir which contact the bolometer element below the transition temperature of the metal from which the element is constructed. Thus in the case of tin this must be below 3.73° K. and is conveniently accomplished by means of a liquid helium bath maintained slightly below the Lambda point of the liquid helium (2.17° K.). Superfluid helium of this temperature has two advantages: the heat capacity in this temperature region is very large, and its thermal conductivity is also large. These characteristics contribute to the stability of the reservoir temperature.

In actual operation after the element has been cooled to render the tin superconducting the central portion 12 is rendered resistive such as by application of a magnetic field. Then a small current is passed through the film, from one end to the other, and the magnetic field is removed. This current is chosen to have such a magnitude that the central region of the film will remain in the normal state on account of the power dissipated there by the current. In other words, the regions near the two ends of the film, which are closest to the reservoir, are superconducting, but the center of the film is in the normal state, maintained in this condition by the flow of a constant heating current. For the dimensions of the thin film of tin of this example, a current of a few milliamperes is sufficient to maintain a temperature difference of the order of 2° K. between the center of the tin strip and its ends.

If external radiation is now allowed to fall on the bolometer strip, the absorption of the radiation brings about an additional flow of heat, which in turn will cause the length of the normal region to expand. The length of the normal region, and thereby the measured potential difference produced by the heating current between the two ends of the film, is then a measure of the incident radiant power. The superconducting strip bolometer of this invention may then be further described as having an element with a central normal region of variable length.

The operation of the bolometer of this invention may be further described with reference to the heat-flow pattern established in the sensing elements 10 and 10a. Heat is generated by the measuring current in the central (normally conducting) portion of the film. No heat is generated in the two ends of the strip since they are superconducting. The heat generated at the center flows by conduction through both ends to the reservoir. As a result of this heat-flow pattern, the strip will have its highest temperature in the center, with the temperature falling off at both ends symmetrically to the reservoir temperature. The temperature then passes through the superconducting transition temperature somewhat more than halfway between the center and the ends. This temperature distribution in the element and the heat flow pattern described are important aspects of the bolometer of this invention.

The principle of operation just described provides the device with characteristics which distinguish it from the prior art devices described above. In the first place, a relatively large temperature difference is maintained between the center and the ends of the film of the bolometer of this invention, as mentioned above. As a result, fluctuations in reservoir temperature are much less important than, for example, in a bolometer requiring the entire element to remain in a state intermediate between superconducting and resistive. In the second place, the thermal capacity of my bolometer is as small as it can be made if conduction is employed as the principal mode of heat transfer. For speed of operation, it is desirable to have a high heat conductance from the center to the ends. This can be achieved by using very pure tin as a working material.

Finally, a film of a pure superconducting metal such as tin is capable of carrying a relatively large current without self-quenching at a temperature somewhat below the transition temperature in zero external magnetic field. The small bias current necessary to maintain the central normal region is thus a small fraction of the critical current in the superconducting portion of the strip, except in a region near the boundary of the superconducting and normal segments. In this boundary region a small segment of the film must be in the intermediate state, as a result of quenching produced by the bias current. However, this intermediate state section comprises only a very small portion of the film. Domain fluctuations in the intermediate state are then correspondingly unimportant.

One of the primary objects of this invention was stated to be the provision of a radiant energy measuring device having a noise level which approached the theoretically irreducible minimum, thus distinguishing the device of this invention over other known thermal detectors. The two sources of noise in a thermal detector are the so-called Johnson noise (which is due to the random motion of electric charge in the strip material) and the spontaneous fluctuations in temperature experienced by the sensing element. By using a superconducting material as sensing elements and maintaining their terminal ends at a temperature below which the material is superconducting in the bolometer of this invention, both of these inherent sources of noise are reduced beyond the reductions possible in other thermal detectors known. Moreover, current noise present in semiconductor bolometers is eliminated.

As pointed out earlier, one of the principal objections to the prior art superconducting bolometer was its sensitivity to reservoir temperature fluctuations. By employing the method of this invention, involving for example a maximum temperature difference between the center of the bolometer and the reservoir approximately 100 times larger than for the prior art bolometer (2° K. instead of 0.02° K.), the effect of reservoir temperature fluctuations will be much less important than in that device.

It may be seen from the detailed description of the bolometer of this invention that there is provided a truly superconducting bolometer which exhibits performance characteristics hitherto unattainable in thermal detecting devices. These characteristics include an extremely low noise level, and a relatively rapid response. Thus this superconducting bolometer is applicable to measuring the intensity of radiant flux at very low power levels particularly in the far infrared and short wave length microwave regions of the electromagnetic spectrum.

I claim:

1. A bolometer comprising a thin elongate element responsive to radiant flux incident thereon and circuitry adapted to determine variations in resistance of said element with variations in the intensity of said radiant flux, said element being formed of a material capable of exhibiting superconductivity; the bolometer being further characterized as having temperature-controlling means associated with said element and adapted to maintain the terminal ends of said element in the superconductive state, and means to maintain the central portion of said element in the normal resistive state, whereby the length of said portion in the normal resistive state varies in responsive relationship to the amount of radiant flux striking said element.

2. Bolometer in accordance with claim 1 wherein said element is a thin strip of essentially pure tin.

3. Bolometer in accordance with claim 1 wherein said element is a thin strip of essentially pure lead.

4. Bolometer in accordance with claim 1 wherein said element is a thin strip of essentially pure thallium.

5. Bolometer in accordance with claim 1 wherein said element is a thin strip of essentially pure indium.

6. Bolometer in accordance with claim 1 wherein said temperature-controlling means is a reservoir of liquid helium.

7. Thermal detecting device for measuring intensity of radiation, comprising superconducting sensing element means responsive to radiant flux incident thereon, temperature-controlling means for maintaining the terminal ends of said element means in a superconductive state, means for maintaining the central portion of said element in the normal resistive state, and means for measuring the change in length of said central portion in responsive relation to said radiant flux incident on said sensing element.

8. Thermal detecting device in accordance with claim 7 including means for chopping said radiant flux incident on said sensing element means.

9. Thermal detecting device for measuring intensity of radiation, comprising superconductive sensing element means responsive to radiant flux incident thereon, temperature-controlling means for maintaining the terminal ends of said element means in a superconductive state, means for maintaining the central portion of said element in the normal resistive state, first circuit means adapted to provide a stable current in said element thereby to maintain said central portion in the normal resistive state, and second circuit means for measuring variations in resistance corresponding to variations in the length of said central portion in responsive relation to said radiant flux incident on said central portion of said sensing element.

10. Thermal detecting device in accordance with claim 9 wherein said sensing element means comprises two substantially identical, balanced strips in a bridge circuit.

11. Thermal detecting device in accordance with claim 10 further characterized by having chopping means adapted to permit said radiant flux to alternately strike one and then the other of said strips.

12. Thermal detecting device in accordance with claim 9 wherein said sensing element means comprises a thin substantially pure tin strip supported on a thin aluminum oxide substrate.

13. Thermal detecting device in accordance with claim 9 wherein said temperature-controlling means is a thermal reservoir cooled by liquid helium.

14. Thermal detecting device in accordance with claim 9 wherein said second circuit means includes a superconductive step-up output transformer.

15. Thermal detecting device for measuring intensity of radiation, comprising low temperature reservoir means including projections spaced apart and defining an opening therebetween; superconductive sensing element means in the form of thin strips responsive to radiant flux incident thereon, said sensing elements being affixed to said reservoir means in a manner to form thermal contact between the ends of said sensing elements and said projections and to extend across said opening, whereby said terminal ends may be cooled to a temperature below which said sensing elements become superconducting; means operable within said opening and adapted to render the central portion of said sensing element means in normal resistive state; means for providing a stable current in said sensing element means thereby to maintain said central portion in said resistive state; and means for measuring variations in resistance corresponding to variations in the length of said central portion in responsive relation to said radiant flux incident on said central portion of said sensing element.

16. Thermal detecting device in accordance with claim 15 including magnetic shielding means surrounding a portion of said sensing element means.

17. Thermal detecting device in accordance with claim 15 wherein said low-temperature reservoir is a vessel capable of storing liquid helium, and said arms are copper in thermal contact with said liquid helium.

18. Thermal detecting device in accordance with claim 15 wherein said means adapted to render said central portion of said sensing element means in normal resistive state comprises means for applying a magnetic field around said central portion.

References Cited in the file of this patent

UNITED STATES PATENTS 2,516,873  Havens et al. _____ Aug. 1, 1950

(Other references on following page)

UNITED STATES PATENTS

| 2,705,274 | Buck | Mar. 29, 1955 |
| 2,768,527 | Stern et al. | Oct. 30, 1956 |
| 2,920,205 | Choyke | Jan. 5, 1960 |
| 2,932,743 | Atwood | Apr. 12, 1960 |

OTHER REFERENCES

The Detection and Measurement of Infra-Red Radiation, by R. A. Smith et al., published by Oxford University Press, London, England, 1958, pages 267, 268, 271–275.